United States Patent Office 3,069,352
Patented Dec. 18, 1962

3,069,352
PROCESS FOR REGENERATING AND REACTIVATING PLATINUM CATALYST IN A REFORMING PROCESS
Max A. Mosesman, Baytown, Tex., assignor, by mesne assignments, to Esso Research and Engineering Company, Elizabeth, N.J., a corporation of Delaware
No Drawing. Filed July 8, 1955, Ser. No. 520,921
2 Claims. (Cl. 208—140)

This application is directed to the reforming of hydrocarbons in the presence of hydrogen over a bed of platinum catalyst and particularly to a procedure for periodically regenerating and reactivating the platinum catalyst in order to maintain the activity thereof.

It is known to reform a hydrocarbon feed stock by flowing vaporized feed stock and hydrogen through a reaction zone containing a platinum catalyst. After the platinum catalyst has been in use for some time, carbon and carbonaceous material accumulate thereon so that it loses its activity for converting hydrocarbons. In accordance with the present invention the platinum catalyst is regenerated by performing a series of operations including the steps of displacing feed stock from the catalyst by passing hydrogen rich gas into contact with said catalyst to displace the hydrocarbons of six carbon atoms and heavier therefrom, then evacuating the catalyst chamber at a suitable subatmospheric pressure (e.g., a vacuum of about 10 to 1.5 inches of mercury absolute) for 10 minutes to 2 hours, removing the carbon and carbonaceous compounds from the platinum catalyst by controlled combustion at which the temperature of the flame front does not exceed 1100° F. by charging an oxygen-containing gas thereto, again evacuating the catalyst chamber at subatmospheric pressure (e.g., a vacuum of about 10 to 1.5 inches of mercury absolute) for 10 minutes to 2 hours, activating the catalyst by contacting it with hydrogen rich gas at a temperature above the dew point of the feed stock and no greater than 1100° F. and then returning the catalyst to reaction conditions by passing a mixture of vaporized hydrocarbon feed stock and hydrogen into contact with the catalyst in the reaction zone.

A feature of the present invention is preventing the simultaneous presence of carbon dioxide and hydrogen on the catalyst at elevated temperatures. The reason for this is that the simultaneous presence of hydrogen and carbon dioxide on the catalyst at elevated temperatures is particularly deleterious to catalyst activity. Carbon monoxide per se may also be harmful. This is accomplished by evacuating the catalyst chamber by suitable pressure-reducing means so that the catalyst chamber is subjected to a reduced (i.e., subatmospheric) pressure such as, for example, a vacuum of about 20 to 28.5 inches of mercury, which corresponds to an absolute pressure of about 10 to 1.5 inches of mercury, for about 10 minutes to 2 hours both before and after the catalyst regeneration step.

The platinum catalyst may be regenerated through the utilization of a flue gas which may be brought into contact with the catalyst in admixture with oxygen under conditions such that controlled oxidation of the catalyst may be caused to take place at a temperature not exceeding 1100° F. The oxygen may also be admixed with any other suitable non-combustion supporting gas such as nitrogen, etc.

The term "flue gas" is here employed in its conventional meaning of a gas resulting from the combustion of fuel. In the present process, flue gas may conveniently be obtained by the deliberate, substantially complete combustion of a fuel such as methane or natural gas in a so-called inert gas generator, or it may be the gas recovered in the regeneration step, resulting from the combustion of carbonaceous matter from the catalyst bed, or it may be an admixture of gas from both sources.

The maximum $CO_2$ content which may be found in flue gas from the complete combustion of natural gas is 12.1%. Other known gaseous fuels may result in $CO_2$ contents from 10.7% to 23.8%.

Typical flue gas analyses from the two sources mentioned above may be as follows:

| | 1<br>Generated from natural gas | 2<br>From regeneration of catalyst |
|---|---|---|
| $CO_2$ | 10 | 7 |
| $H_2O$ | 15 | 16 |
| $N_2$ | 75 | 77 |
| $CO$ | Trace | Trace |

For convenience, the general sequence of operations and the composition of the various fluid streams during a typical reaction-regeneration cycle is set out hereafter in Table I.

TABLE I (1) Vaporized naptha plus hydrogen
(2) Hydrogen rich gas
(3) Evacuation at 10 to 1.5 inches of mercury absolute for 10 minutes to 2 hours
(4) Combustion supporting gas mixture free from $H_2$
(5) Evacuation at 10 to 1.5 inches of mercury absolute for 10 minutes to 2 hours
(6) Hydrogen rich gas
(7) Vaporized naphtha plus hydrogen A specific example of a reaction-regeneration cycle is given by way of illustration and not by way of limitation in Table II, as follows:

TABLE II

Regeneration of Alumina Supported Platinum Catalyst

| Step No. | Duration (in hours) | Operation |
|---|---|---|
| 1 | | Charge Reaction of Vaporized Naphtha and Hydrogen-containing Gas at, e.g.:<br>Feed charge rate, 6 V./V./Hr.<br>Hydrogen charge rate, 2,500 Cubic Ft. of $H_2$ Bbl. of Feed.<br>Pressure, 225 p.s.i.g.<br>Reactor inlet temperature, 925° F. |
| 2 | ½ | Cut out Vaporized Naphtha and Maintain Reaction Conditions while Charging only Hydrogen-containing Gas. |
| 3 | ¼ | Reduce Pressure to Atmospheric and then Cut out Hydrogen Rich Gas. |
| 4 | ¼ | Evacuate to 5 Inches of Mercury Absolute. |
| 5 | ¼ | Increase Pressure to Atmospheric and then Commence Charging Flue Gas containing about:<br>$CO_2$—10 volume percent.<br>$H_2O$—0.3 volume percent.<br>$N_2$—90 volume percent. |
| 6 | ½ | Repressure to 225 p.s.i.g. with Continued Charge of Flue Gas. |
| 7 | 5 | Raise temperature to 750° F. to regenerate Catalyst and Commence Addition of Gas containing about:<br>$CO_2$—10 volume percent.<br>$H_2O$—0.3 volume percent.<br>$N_2$—89 volume percent.<br>$O_2$—1.0 volume percent. |
| 8 | ¼ | Cut out Oxygen and Bring Reactor to Atmospheric Pressure. |
| 9 | ¼ | Evacuate to 5 Inches of Mercury Absolute. |
| 10 | ¼ | Increase Pressure to Atmospheric and Commence Charge of Hydrogen-containing Gas. |
| 11 | ½ | Increase Reactor Inlet Temperature to 925° F. and Pressure to 225 p.s.i.g. |
| 12 | | Repeat Step No. 1. |

The catalytic reforming of a hydrocarbon feed stock and particularly naphthenic hydrocarbon containing feed stocks is known to the art. Such naphthenic hydrocarbons usually boil in the range from about 150° to 500° F. and may be obtained from crude petroleums such as the Coastal crude oils, California type crudes and particularly from naphthenic base crude petroleum. Such naphthenic fractions boiling in the range of 150° to 500° F. may also be obtained from catalytic conversion operations such as catalytic operations and may be employed either alone or in admixture with crude oil fractions as the feed stock for a reforming operation.

In the reforming of hydrocarbon feed stocks it is preferred to pass vaporized feed stock through the reaction zone at a liquid space velocity in the range from about 1 to about 4 liquid volumes of feed per volume of catalyst per hour. A space velocity of 2 v./v./hr. gives very desirable results when charging a Coastal crude fraction.

The reactor inlet temperature may be within the range of 850° to 1000° F. with a preferred temperature of about 925° F. The reforming reaction being endothermic, and commercial reactors ordinarily operating adiabatically the reactor outlet temperature will ordinarily be between 700° and 950° F. With a platinum catalyst of satisfactory activity, the temperature drop between inlet and outlet will generally be in the range of about 120° F. to about 150° F.

The pressure employed in the reaction zone may be within the range of 50 to 700 pounds per square inch with a preferred range of about 200 to about 400 pounds per square inch.

The amount of hydrogen employed for the reaction may range from about 1000 cubic feet to about 10,000 cubic feet per barrel of feed. Preferably about 5000 cubic feet of hydrogen per barrel of feed may be used.

The catalyst employed in the practice of the present invention preferably will be a platinum on alumina catalyst containing from about 0.1% to 3.0% by weight of platinum, preferably 0.2% to 0.1% by weight. It is desirable that the alumina on which the platinum is deposited be a purified alumina, such as a gamma alumina derived from boehmite. Although gamma alumina or purified alumina is preferred, I may use a platinum on alumina derived from other sources. There are numerous aluminas on the market which are available as supports for catalysts and I intend that I may use a platinum on alumina catalyst of the type available. I also intend that other supported platinum catalysts may be used such as platinum on zirconia, magnesia, and magnesia-alumina mixtures, and the like.

In accordance with the present invention, the procedure for regenerating a platinum catalyst which has become fouled with carbon and carbonaceous material involves the carrying out of the following steps in sequence. The platinum catalyst is taken out of service by cutting out the vapors of feed stock while continuing the flow of the hydrogen containing gas until the hydrocarbons having 6 or more carbon atoms in the molecule, are displaced from the reaction zone by the stream of gas. Thereafter the reaction chamber containing the bed of platinum catalyst is evacuated at a pressure of about 20 to 28.5 inches of mercury vacuum for 10 minutes to 2 hours. The carbon and carbonaceous deposits are then removed from the catalyst by controlled combustion by flowing into the reaction zone regenerating gas consisting of a non-combustible, non-combustion supporting component (e.g., flue gas, nitrogen, etc.) and controlled amounts of oxygen so that the flame front of the flame advancing through the catalyst bed never exceeds 1100° F. After the controlled combustion has removed the deposits of carbon and carbonaceous material from the bed, the entire reaction zone containing the platinum catalyst is again purged by the application of a reduced or subatmospheric pressure of about 20 to 28.5 inches of mercury vacuum (i.e., 10 to 1.5 inches of mercury absolute) for about 10 minutes to 2 hours. After said evacuation step, the platinum catalyst may then be activated by first passing hydrogen containing gas into said reaction zone to bring the temperature of the catalyst gradually to a temperature approaching the desired reactor inlet temperature, within the range of 850° to 1000° F., and the reaction chamber is then placed onstream by introducing a mixture of vaporized feed stock and hydrogen into said reaction chamber to cause reforming of said feed stock. In this fashion the cycle may be continually repeated.

It should be understood that the present invention is equally applicable in the situation where platinum catalyst is subjected to a reactivation step after it has lost part of its activity in such manner that conventional regeneration will not restore it to the desired activity. In such an operation, the controlled combustion step as described herein may be followed by a period during which the catalyst is contacted at an elevated temperature with oxygen containing gas having a partial pressure of at least one atmosphere of oxygen. According to the present invention, the oxygen containing gas will be displaced from the catalyst at the completion of the reactivation step by the application of a reduced or subatmospheric pressure of about 20 to 28.5 inches of mercury vacuum for about 10 minutes to 2 hours, followed by contact with hydrocarbon feed and hydrogen under reaction conditions.

A specific example of the sequence of operations and the composition of the various fluid streams to be used during a typical reactivation cycle is set forth hereafter in Table III, such sequence of operations being given by way of illustration and not by way of limitation.

TABLE III

*Reactivation of Alumina-Supported Platinum Catalyst*

| Step No. | Duration in Hours | Operation |
|---|---|---|
| 1 | | Charge Reaction of Vaporized Naphtha and Hydrogen-containing Gas at, e.g.: Feed charge rate, 6 V./V./Hr. Hydrogen charge rate, 2,500 Cubic Ft. of $H_2$/Bbl. of Feed. Pressure, 225 p.s.i.g. Reactor inlet temperature, 925° F. |
| 2 | ½ | Cut out Vaporized Naphtha and Maintain Reaction Conditions while Charging only Hydrogen-containing Gas. |
| 3 | ¼ | Reduce Pressure to Atmospheric and then Cut Out Hydrogen Rich Gas. |
| 4 | ¼ | Evacuate to 5 Inches of Mercury Absolute. |
| 5 | ¼ | Increase Pressure to Atmospheric and then Commence Charging Flue Gas containing about: $CO_2$—10 volume percent. $H_2O$—0.3 volume percent. $N_2$—90 volume percent. |
| 6 | ½ | Repressure to 225 p.s.i.g. with Continued Charge of Flue Gas. |
| 7 | 5 | Raise temperature to 750° F. to regenerate Catalyst and Commence Addition of Gas containing about: $CO_2$—10 volume percent. $H_2O$—0.3 volume percent. $N_2$—89 volume percent. $O_2$—1.0 volume percent. |
| 8 | 1 to 4 | Gradually Increase Inlet Temperature to 950° F. at 225 p.s.i.g. |
| 9 | 1 to 4 | Gradually Increase Oxygen Content of Flue Gas to about 5 to 10 volume percent. |
| 10a [1] | 4 | Reactivate Catalyst with Flue Gas Containing: $CO_2$—5 volume percent. $H_2O$—0.3 volume percent. $N_2$—85 volume percent. $O_2$—5 volume percent. |
| 10b [1] | 30 | Reactivate Catalyst with Flue Gas Containing: $CO_2$—7 volume percent. $H_2O$—0.3 volume percent. $N_2$—88 volume percent. $O_2$—5 volume percent. |
| 11 | 1 to 4 | Reduce Temperature to Less than About 800° F. |
| 12 | ¼ | Cut out Oxygen and Bring Reactor to Atmospheric Pressure. |
| 13 | ¼ | Evacuate to 5 Inches of Mercury Absolute. |
| 14 | ¼ | Increase Pressure to Atmospheric and Commerce Charge of Hydrogen-containing Gas. |
| 15 | ½ | Increase Reactor Inlet Temperature to 925° F. and Pressure to 225 p.s.i.g. |
| 16 | | Repeat Step No. 1. |

[1] Steps 10a and 10b represent alternate, not simultaneous, reactivation steps to be used with oxygen contents of 5 and 10 volume percent, respectively.

The present invention may be considered in conjunction with the following specific example which is given by way of illustration and is not intended as a limitation on the scope of this invention.

EXAMPLE I

In the following example there was used a severely deactivated platinum-alumina catalyst exhibiting only about a 60° F. temperature drop when contacted with a light catalytic naphtha fraction of 6 v./v./hr. and 2500 cubic feet of hydrogen per barrel of feed stock at a pressure of about 225 p.s.i.g. and an inlet temperature of about 925° F.

The catalyst was placed in a suitable reaction vessel and hydrogen was caused to flow therethrough at a pressure of 225 p.s.i.g. at a temperature of about 800° to 900° F. at the rate of 5 cubic feet per hour in order to simulate the terminal step of a normal reaction cycle (supra). The reaction vessel was then depressured to atmospheric pressure and evacuated for 30 minutes at 28.5 inches of mercury vacuum.

At the end of this time the reaction vessel was charged with a gas comprising a mixture of 10% carbon dioxide and nitrogen at 50 p.s.i.g. at 850° F. at the rate of 10 cubic feet per hour for 30 minutes in order to maximize any effect that would be obtainable if hydrogen were present in the reaction vessel at the time carbon dioxide charge was initiated.

At the end of this time the addition of carbon dioxide was discontinued and there was charged instead a mixture of about 5% of air and nitrogen in order to regenerate the deactivated catalyst. Regeneration conditions included a pressure of 50 p.s.i.g., an inlet temperature of 800° F. and a charge rate of 10.5 cubic feet of gas per hour. During regeneration the amount of nitrogen contained in the regeneration gas was progressively diminished until at the terminal stage of regeneration the gaseous charge consisted of 10 cubic feet per hour of air per hour which was charged at a pressure of 50 p.s.i.g. and an inlet temperature of 900° F.

At the end of the regeneration step the catalyst was again purged for 30 minutes at a temperature of 850° F. with a gas consisting of nitrogen admixed with 10% of carbon dioxide. Thereafter the reaction vessel was depressured to atmospheric pressure and then evacuated for 30 minutes at 28.5 inches of mercury vacuum.

Thereafter hydrogen was charged to the reaction vessel at a pressure of 225 p.s.i.g. to activate the catalyst and then a mixture of hydrogen and light crude naphtha was charged at the rate of 2500 cubic feet of hydrogen per barrel of feed stock at 6 v./v./hr. at 225 p.s.i.g. and an inlet temperature of 925° F. It was found that the temperature drop through the reactor amounted to about 120° F.

When the catalyst had again become deactivated it was regenerated under the conditions set forth above except that a nitrogen purge step was substituted for the reduced pressure treatment at the beginning and end of the regeneration cycle wherein 10 cubic feet of nitrogen per hour were charged for 30 minutes before the regeneration step to remove hydrogen and wherein 10 cubic feet of nitrogen per hour were charged at the completion of the regeneration step to remove carbon dioxide. In this instance it was found that a temperature drop of only about 100° F. was obtainable after regeneration.

What is claimed as the present invention is:

1. In a regenerative platinum reforming process wherein a vaporized naphthenic hydrocarbon feed stock boiling within the range of about 150° to 500° F. is subjected to reforming conditions in a reaction zone in contact with a fixed bed of alumina supported platinum catalyst containing from about 0.1 to about 3.0 weight percent of platinum under reforming conditions including a hydrogen charge rate of about 1000 to 10,000 cubic feet of hydrogen per barrel of naphthenic hydrocarbon, a temperature within the range of about 850° to 1000° F., a pressure within the range of about 50 to about 700 p.s.i. and a space velocity within the range of about 1 to 4 volumes of naphthenic hydrocarbon feed per volume of catalyst per hour to reform at least a portion of the hydrocarbons in said feed stock and wherein said contacting step is continued until excessive amounts of carbonaceous materials have been deposited on said catalyst, the improved method for regenerating said bed of catalyst which comprises discontinuing the flow of said charge mixture into said reaction zone while continuing the flow of hydrogen-containing gases into said reaction zone under reaction conditions to displace hydrocarbon components of said feed stock from said reaction zone over about a 30 minute period, next reducing the pressure in said reaction zone to about atmospheric pressure over about a 15 minute period, next discontinuing the flow of said hydrogen-rich gas into said reaction zone, next reducing the pressure in said reaction zone over about a 15 minute period to about 5 inches of mercury absolute to substantially completely remove hydrogen from said reaction zone, thereafter increasing the pressure in said reaction zone to about atmospheric pressure over about a 15 minute period and initiating the flow of a flue gas through said reaction zone, increasing the pressure in said reaction zone to a pressure of about 200 to 400 p.s.i.g. over about a 30 minute period, next admixing a controlled amount of air with said flue gas while raising the temperature in said reaction zone to a temperature of about 750° F. to cause combustion of said carbonaceous deposits in said catalyst bed with a combustion flame front in the bed of at least 750° F. but not more than about 1100° F., next discontinuing the flow of air into said reaction zone, next, over about a 15 minute period, reducing the pressure in said reaction zone to about atmospheric pressure, next terminating the flow of said flue gas to said reaction zone and reducing the pressure in said reaction zone to about 5 inches of mercury absolute over about a 15 minute period, next increasing the pressure in said reaction zone to about atmospheric pressure over about a 15 minute period and re-initiating the flow of hydrogen-containing gas in said reaction zone whereby said catalyst is substantially completely restored to its initial activity, next reestablishing said reforming conditions in said reaction zone to reform additional quantities of said naphthenic hydrocarbon.

2. A process as in claim 1 wherein the amount of air admixed with said flue gas is such that said mixture initially contains about 1 volume percent of oxygen and wherein the oxygen content of said gas is progressively increased to about 5 to 10 volume percent over a period of about 1 to 4 hours.

References Cited in the file of this patent

UNITED STATES PATENTS

| | | |
|---|---|---|
| 2,226,548 | Burk | Dec. 31, 1940 |
| 2,478,916 | Haensel et al. | Aug. 16, 1949 |
| 2,578,704 | Houdry | Dec. 18, 1951 |
| 2,688,588 | Beam | Sept. 7, 1954 |
| 2,739,928 | Thayer | Mar. 27, 1956 |
| 2,792,337 | Engel | May 14, 1957 |